(12) United States Patent
Takeo

(10) Patent No.: US 7,430,341 B2
(45) Date of Patent: Sep. 30, 2008

(54) IMAGE UNDERSTANDING AIDING SYSTEM, IMAGE POSITION MATCHING APPARATUS, AND IMAGE OUTPUT DEVICE

(75) Inventor: Hideya Takeo, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 302 days.

(21) Appl. No.: 11/171,343

(22) Filed: Jul. 1, 2005

(65) Prior Publication Data

US 2006/0002633 A1    Jan. 5, 2006

(30) Foreign Application Priority Data

Jul. 1, 2004    (JP)    ............... 2004-195531

(51) Int. Cl.
G06K 9/32    (2006.01)
G06K 9/68    (2006.01)
G06K 9/00    (2006.01)
(52) U.S. Cl. ............... 382/294; 382/128; 382/218
(58) Field of Classification Search ......... 382/128, 382/218, 294
See application file for complete search history.

(56) References Cited

U.S. PATENT DOCUMENTS 5,784,431 A * 7/1998 Kalend et al. ............ 378/65
6,310,477 B1 * 10/2001 Schneider ............... 324/307
6,351,660 B1 * 2/2002 Burke et al. ............ 600/425
6,477,262 B2 * 11/2002 Wang .................... 382/132
6,909,792 B1 * 6/2005 Carrott et al. ........... 382/128

FOREIGN PATENT DOCUMENTS

JP    2002-65613 A    3/2002

\* cited by examiner

Primary Examiner—Samir A. Ahmed
Assistant Examiner—Stephen R Koziol
(74) Attorney, Agent, or Firm—Sughrue Mion, PLLC

(57) ABSTRACT

An image position matching apparatus performs position matching, such that positions of reference areas in two original images align with each other, and supplies information, which represents a translation quantity for aligning the positions of the reference areas in the two original images with each other, and the two original images into an image output device. The image output device aligns the positions of the reference areas in the two original images with each other in accordance with the translation quantity information and the two original images having been received from the image position matching apparatus and outputs the two aligned images, such that the two aligned images are located in a line.

20 Claims, 11 Drawing Sheets

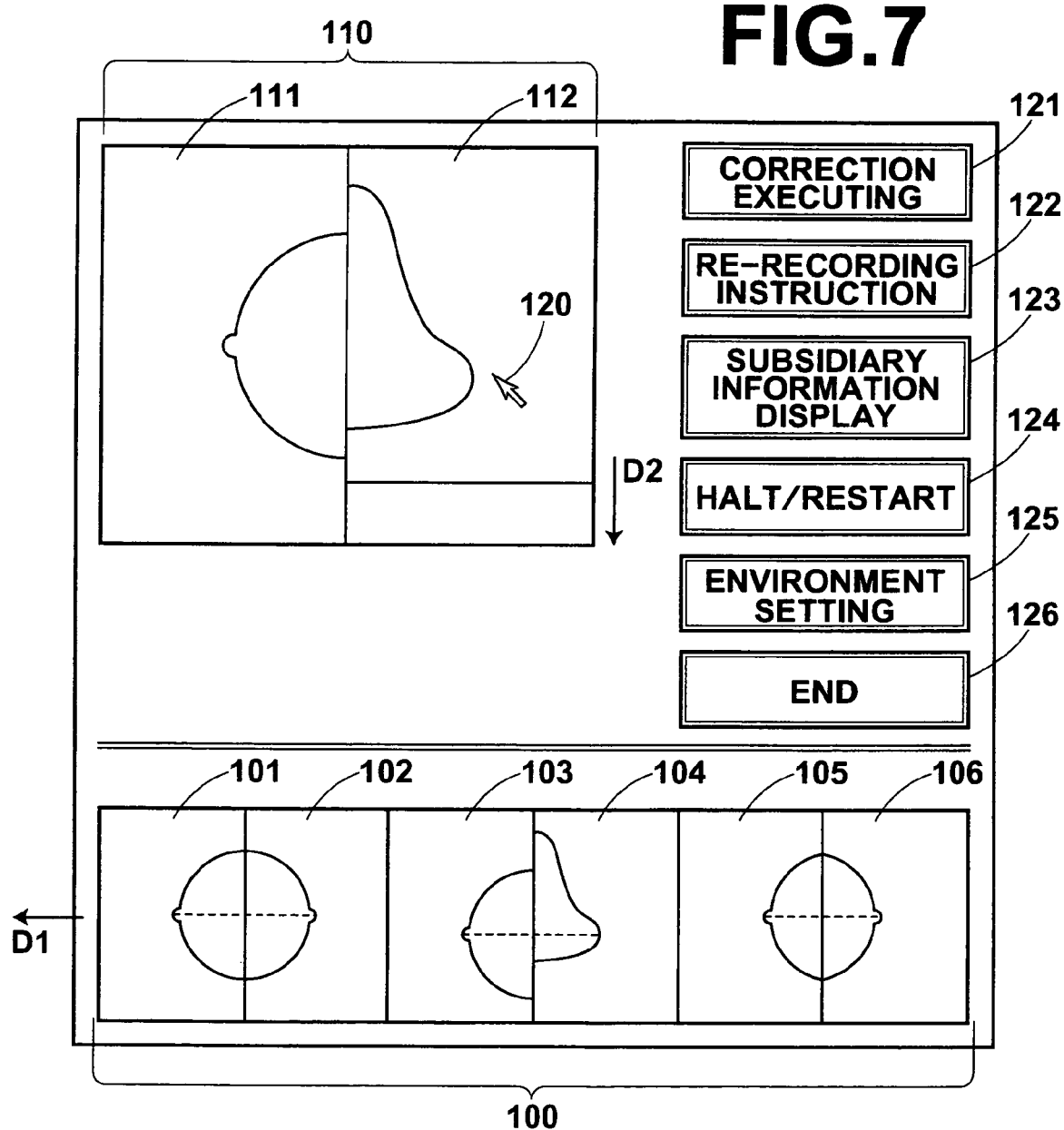

| DISTRIBUTION DESTINATION ID CODE | KIND OF IMAGE OUTPUT DEVICE | DISTRIBUTED DATA | |
|---|---|---|---|
| | | SET OF ORIGINAL IMAGE SIGNALS AND TRANSLATION QUANTITY INFORMATION | POSITION MATCHING-PROCESSED COMPOSITE IMAGE SIGNAL |
| A | FILM PRINTER | × | ○ |
| B | IMAGE VIEWER | ○ | × |
| C | IMAGE VIEWER | ○ | ○ |

FIG.11

IMAGE UNDERSTANDING AIDING SYSTEM, IMAGE POSITION MATCHING APPARATUS, AND IMAGE OUTPUT DEVICE

BACKGROUND OF THE INVENTION

1. Field of the Invention

This invention relates to an image understanding aiding system, an image position matching apparatus, and an image output device. This invention particularly relates to an image understanding aiding system, wherein position matching processing is performed on two images of a pair of objects, which are to be compared with each other, in cases where the two images are to be outputted such that the two images are located in a line. This invention also relates to devices for constituting the image understanding aiding system.

2. Description of the Related Art

In cases where images of a pair of breasts, which images have been recorded, are outputted to hard copy output media, such as film, or soft copy output media, such as a CRT and an LCD, the images have heretofore been outputted in a format (as illustrated in FIG. 6A), in which the images of the right and left breasts stand back to back with each other, such that image understanding of the images of the right and left breasts may be performed easily. The image output format described above is based upon the findings in that the structures of the right and left breasts, particularly the structures of the breastry glands of the right and left breasts, are approximately symmetrical with each other. In cases where the images of the right and left breasts are outputted in the format described above, the comparison and seeing of the images of the right and left breasts are capable of being performed easy. Also, in cases where an abnormal pattern, such as a cancer pattern, is embedded in one of the images of the right and left breasts, the resulting asymmetric distribution of image densities is capable of being found easily. Further, finding failures at the time of diagnoses are capable of being prevented from occurring.

However, in cases where the two images of the right and left breasts are simply located in a line such that the two images may stand back to back with each other, it may often occur that the two images of the right and left breasts are outputted in a pattern other than the symmetric pattern due to, for example, a deviation in positioning at the time of image recording operations (as illustrated in FIG. 6B).

Therefore, the applicant proposed an image displaying system for displaying medical images of two objects, which are to be compared with each other, on a display screen of an image displaying device, such that the two images are located in a line along a horizontal direction, wherein the image displaying system further comprises position matching processing means for matching the positions of the medical images with each other, such that corresponding positions of the object patterns may align with each other on the display screen. With the proposed image displaying system, the position matching processing means is constituted as means for manually performing vertical translation of at least either one of the two medical images on the display screen of the image displaying device by use of a mouse device. Alternatively, the position matching processing means is constituted as means for automatically detecting the corresponding positions of the object patterns in the two medical images and automatically translating at least either one of the two medical images, such that the corresponding positions having been detected may align with each other on the display screen. (The proposed image displaying system is described in, for example, Japanese Unexamined Patent Publication No. 2002-065613.)

However, in cases where a plurality of diagnosing persons see the same pair of the breast images by the utilization of the image displaying systems as described in, for example, Japanese Unexamined Patent Publication No. 2002-065613, which image displaying systems are located at the diagnosing persons, the same position matching processing is performed in each of the image displaying systems. Therefore, as the entire system, the same position matching processing is iterated in the image displaying systems, and the efficiency of the processing is not capable of being kept high.

SUMMARY OF THE INVENTION

The primary object of the present invention is to provide an image understanding aiding system wherein, in cases where two images of a pair of objects to be compared with each other are to be outputted such that the two images are located in a line on an image output device, position matching processing for matching positions of the two images, such that object patterns in the two images become symmetric with each other, is capable of being performed efficiently.

Another object of the present invention is to provide an image position matching apparatus for constituting the image understanding aiding system.

A further object of the present invention is to provide an image output device for constituting the image understanding aiding system.

The present invention provides an image understanding aiding system, wherein a position matching function, which has heretofore been performed by an image output device, is separated from the image output device and provided as an image position matching apparatus, and wherein the image understanding aiding system is constituted as a system comprising the image position matching apparatus and an image output device.

In the image understanding aiding system in accordance with the present invention, the image position matching apparatus operates such that:

the image position matching apparatus receives a plurality of original images of objects, which original images are successively sent from a modality for forming the original images, (with receiving means), the image position matching apparatus performs position matching processing on two original images among the received original images, which two original images are the original images of a pair of objects to be compared with each other and have been recorded at an identical period, in cases where the two original images are to be outputted such that the two original images are located in a line, the position matching processing comprising translation of at least either one of the two original images in a direction normal to the direction along which the two original images are located in a line, such that positions of reference areas in the two original images, which positions are taken with respect to the normal direction, align with each other (with position matching processing means), and the image position matching apparatus supplies information, which represents a translation quantity for aligning the positions of the reference areas in the two original images with each other, and the two original images into the image output device (with supplying means).

Also, in the image understanding aiding system in accordance with the present invention, the image output device operates such that:

the image output device aligns the positions of the reference areas in the two original images with each other in accordance with the information, which represents the translation quantity, and the two original images, the information and the two original images having been received from the image position matching apparatus, and the image output device outputs the two aligned images, whose reference areas have been aligned with each other, such that the two aligned images are located in a line.

The image understanding aiding system in accordance with the present invention may be modified such that the image position matching apparatus selectively supplies a set of the information, which represents the translation quantity, and the two original images, and/or a set of position matching-processed images, which have been obtained from the position matching processing, into the image output device in accordance with a request of the image output device, the image output device aligns the positions of the reference areas in the two original images with each other in accordance with the set of the information, which represents the translation quantity, and the two original images, or in accordance with the set of the position matching-processed images, the set of the information and the two original images or the set of the position matching-processed images having been received from the image position matching apparatus, and the image output device outputs the two aligned images, whose reference areas have been aligned with each other, such that the two aligned images are located in a line.

The image understanding aiding system in accordance with the present invention will hereinbelow be described in more detail.

By way of example, the two original images of the pair of the objects to be compared with each other, which two original images have been recorded at the identical period, maybe medical radiation images of breasts, hands, arms, lower extremities, or the like. In the cases of the medical radiation images of breasts, the combination of the two original images may be a combination of frontal images, a combination of lateral images, a combination of a frontal image of a breast and a lateral image of the breast, or the like. The two original images are the images having been recorded at the identical period and are not the images having been recorded at different periods as in the cases of images for examinations of alterations with the passage of time. The two original images having been recorded at the identical period may be, for example, the two images, which have been recorded at one time of examination.

In cases where the two original images are located in a line along the horizontal direction, the term "direction normal to a direction along which two original images are located in a line" as used herein means the vertical direction. In cases where the two original images are located in a line along the vertical direction, the term "direction normal to a direction along which two original images are located in a line" as used herein means the horizontal direction.

The reference areas in the two original images should preferably be feature areas of the object patterns (such as outer shape feature areas, image density feature areas, or luminance feature areas). The feature areas described above are capable of being detected with one of various kinds of automatic detection processing. Therefore, the utilization of the feature areas as the reference areas in the two original images is efficient for automatic position matching processing. For example, in cases where the objects are the right and left breasts, it is efficient that the comparison and seeing of the images are made with attention being given to the symmetry of the distributions of the breastry glands. Therefore, in such cases, a pattern of a nipple, which is the end point of the breastry glands extending radially, should preferably be taken as each of the reference areas in the two original images.

The position matching processing may be manual processing, in which the two original images are displayed such that the two original images are located in a line, and in which the operator operates an input device, such as a mouse device or a keyboard, in order to perform manual translation of at least either one of the two displayed original images on the display screen of the image position matching apparatus. Alternatively, the position matching processing may be automatic processing, in which the positions of the reference areas in the two original images are detected automatically, and in which at least either one of the two original images is translated automatically, such that the detected positions of the reference areas in the two original images align with each other.

As another alternative, the position matching processing may be a combination of manual processing and automatic processing. Specifically, the position matching processing may be a combination of automatic position matching processing, in which the reference area in at least either one of the two original images is detected, and in which the processing for aligning the position of the detected reference area is performed automatically, and correction processing for manually correcting the result of the automatic position matching processing. More specifically, the automatic position matching processing, in which the reference area in at least either one of the two original images is detected, and in which the processing for aligning the position of the detected reference area is performed automatically, may be performed. Also, the two position matching-processed images may be displayed, such that the two position matching-processed images may be located in a line. Further, at least either one of the two displayed images may be manually translated on the display screen of the image position matching apparatus, and the result of the automatic position matching processing may thereby be corrected. Alternatively, the two position matching-processed images described above may be displayed, such that the two position matching-processed images maybe located in a line, the positions of the reference areas in the two displayed images may be corrected manually, and the corrected positions of the reference areas may be automatically aligned with each other.

The term "information representing a translation quantity for aligning positions of reference areas in two original images with each other" as used herein means the shift quantity between the two original images in the direction normal to the direction along which the two original images are located in a line, the shift quantity having been calculated with the position matching processing.

The position matching-processed images may be supplied as one composed image, in which the two position matching-processed images having been obtained from the position matching processing have been located in a line, such that the positions of the reference areas in the two original images align with each other. Alternatively, the position matching-processed images may be supplied as two independent images, which have been obtained from the processing for translating at least either one of the two original images by the translation quantity for aligning the positions of the reference areas in the two original images with each other, i.e. the two independent images capable of being outputted in the position-matched state in cases where the two independent images are merely located in a line.

The image position matching apparatus may supply the set of the information, which represents the translation quantity, and the two original images, and/or the set of the position matching-processed images directly or indirectly into the image output device. In cases where the image position matching apparatus supplies the set of the information, which represents the translation quantity, and the two original images, and/or the set of the position matching-processed images indirectly into the image output device, the set of the information, which represents the translation quantity, and the two original images, and/or the set of the position matching-processed images may be temporarily supplied from the image position matching apparatus into a device other than the image output device, such as an image storage device for storing and managing images and information associated with the images, and may then be supplied from the device into the image output device. Therefore, the image position matching apparatus supplies the set of the information, which represents the translation quantity, and the two original images, and/or the set of the position matching-processed images directly into the external device, such as the image output device or the image storage device.

The term "in accordance with a request of the image output device" as used herein is not limited to the cases where whether the set of the information, which represents the translation quantity, and the two original images is to be supplied into the image output device or whether the set of the position matching-processed images is to be supplied into the image output device is determined in accordance with information, which is given by the image output device, such as an image request signal, which is sent from the image output device into the image position matching apparatus. The term "in accordance with a request of the image output device" as used herein embraces the cases where whether the set of the information, which represents the translation quantity, and the two original images is to be supplied into the image output device or whether the set of the position matching-processed images is to be supplied into the image output device is determined in accordance with information, which is obtained from processing performed by the image position matching apparatus. Specifically, for example, the term "in accordance with a request of the image output device" as used herein embraces the cases where the image position matching apparatus retrieves specifications of the image output device in order to make a judgment as to whether the image output device is adapted to the input of the set of the information, which represents the translation quantity, and the two original images or to the input of the set of the position matching-processed images, and the image position matching apparatus determines, in accordance with the result of the judgment, whether the set of the information, which represents the translation quantity, and the two original images is to be supplied into the image output device or whether the set of the position matching-processed images is to be supplied into the image output device. Also, for example, the term "in accordance with a request of the image output device" as used herein embraces the cases where the image position matching apparatus makes reference to information concerning input data capable of being processed by each of image output devices, which information has been stored previously in the image position matching apparatus, and the image position matching apparatus determines, in accordance with the previously stored information described above, whether the set of the information, which represents the translation quantity, and the two original images is to be supplied into the image output device or whether the set of the position matching-processed images is to be supplied into the image output device. Further, in cases where the image position matching apparatus supplies the set of the information, which represents the translation quantity, and the two original images, and/or the set of the position matching-processed images indirectly into the image output device as described above, whether the set of the information, which represents the translation quantity, and the two original images is to be supplied into the image output device or whether the set of the position matching-processed images is to be supplied into the image output device may be determined in accordance with a request made by the device, which is other than the image output device and intervenes between the image position matching apparatus and the image output device. Therefore, in accordance with the request made by the external device, such as the image output device or the image storage device, the image position matching apparatus determines whether the set of the information, which represents the translation quantity, and the two original images is to be supplied into the image output device or whether the set of the position matching-processed images is to be supplied into the image output device.

The term "image position matching apparatus selectively supplies" as used herein means that the image position matching apparatus has both the function for forming the aforesaid information, which represents the translation quantity, and the function for forming the position matching-processed images, and the image position matching apparatus determines, in accordance with the request of the external device which is the supply destination, whether the set of the information, which represents the translation quantity, and the two original images is to be supplied into the external device or whether the set of the position matching-processed images is to be supplied into the external device. For example, the image position matching apparatus may operate in the manner described below. Specifically, at the stage of the position matching processing described above, the image position matching apparatus may form both the aforesaid information, which represents the translation quantity, and the position matching-processed images. Also, at the stage of supplying into the external device, the image position matching apparatus may determine, in accordance with the request of the external device which is the supply destination, whether the set of the information, which represents the translation quantity, and the two original images is to be supplied into the external device or whether the set of the position matching-processed images is to be supplied into the external device. Alternatively, the image position matching apparatus may operate in the manner described below. Specifically, at the stage of the position matching processing described above, in accordance with the request of the external device which is the supply destination, the image position matching apparatus may selectively form the aforesaid information, which represents the translation quantity, and/or the position matching-processed images. Also, the image position matching apparatus may supply the set of the thus formed information, which represents the translation quantity, and the two original images, and/or the set of the thus formed position matching-processed images into the external device which is the supply destination.

As another alternative, both the set of the information, which represents the translation quantity, and the two original images and the set of the position matching-processed images may be supplied into the external device, and the external device may utilize the set of the information representing the translation quantity and the two original images or the set of the position matching-processed images, whichever the external device is capable of processing, as the input.

As described above, the image output device aligns the positions of the reference areas in the two original images with each other in accordance with the information, which represents the translation quantity, and the two original images, the information and the two original images having been received from the image position matching apparatus. Also, the image output device outputs the two aligned images, whose reference areas have been aligned with each other, such that the two aligned images are located in a line. In such cases, the image output device may comprise:

i) position adjusting means for adjusting an output position of at least either one of the two original images in accordance with the information, which represents the translation quantity, and the two original images, such that the positions of the reference areas in the two original images align with each other, and ii) output means for outputting the two aligned images, which have been obtained from the adjustment of the output position, such that the two aligned images are located in a line.

The destination of the output from the image output device may be a hard copy output medium, such as film, or a display device, such as a CRT or an LCD, i.e. a soft copy output medium.

By way of example, the image position matching apparatus may be incorporated in a computer referred to as a quality assurance workstation (QA-WS) for receiving a plurality of original images of objects, which original images are successively sent from a modality for the formation of the original images, and performing normalization processing, image quality checking, or the like, on the received original images.

The image position matching apparatus and the image output device may be controlled with computer programs for causing a computer to execute the processing described above.

Transfer of the set of the information, which represents the translation quantity for aligning the positions of the reference areas in the two original images with each other, and the two original images and the set of the position matching-processed images between the image position matching apparatus and the image output device may be performed with data communication through a network, which connects the image position matching apparatus and the image output device with each other. Alternatively, the transfer described above may be performed with a recording medium, such as a CD-ROM or a DVD-ROM, from which the image position matching apparatus and the image output device are capable of reading information.

With the image understanding aiding system in accordance with the present invention, in cases where the two original images of the pair of the objects to be compared with each other are to be outputted such that the two original images are located in a line, the position matching processing is performed on the two original images. The position matching processing comprises translation of at least either one of the two original images in the direction normal to the direction along which the two original images are located in a line, such that the positions of the reference areas in the two original images, which positions are taken with respect to the normal direction described above, align with each other. With the image understanding aiding system in accordance with the present invention, the position matching processing is incorporated at an optimum position within an image understanding work flow for receiving the original images successively sent from the modality for the formation of the original images, making adjustments of the received original images, and outputting the thus adjusted images. Specifically, the position matching processing is separated from the image output device and is performed by the image position matching apparatus. Therefore, in cases where the same pair of the images are to be seen on a plurality of image output devices, the same position matching processing need not be performed by each of the image output devices, and the image position matching apparatus is capable of performing the position matching processing collectively as preliminary processing. Accordingly, as the entire system, the efficiency of the processing is capable of being kept high.

For the person, who sees the images, it will be important that the seeing of the images by the utilization of information which the original images have, such as intentional positioning of the objects performed by the operator for the image recording operations, is capable of being performed. In the cases of the image displaying system as described in, for example, Japanese Unexamined Patent Publication No. 2002-065613, since the original images before being subjected to the position matching processing are present in the image displaying system, the original images are capable of being seen on the image displaying system. However, if the position matching processing is merely separated from the image output device, and only the position matching-processed images are supplied into the image output device, since the original images are not inputted into the image output device, it will not be possible for the person, who sees the images, to see the original images on the image output device. Therefore, with the image understanding aiding system in accordance with the present invention, the image position matching apparatus supplies the set of the information, which represents the translation quantity for aligning the positions of the reference areas in the two original images with each other and which is formed as a result of the position matching processing, and the two original images into the image output device. Also, in accordance with the received set of the information, which represents the translation quantity, and the two original images, the image output device aligns the positions of the reference areas in the two original images with each other and outputs the two aligned images, whose reference areas have been aligned with each other, such that the two aligned images are located in a line. Accordingly, on the side of the image output device, the position matching-processed images are capable of seen. Further, since the original images are supplied into the image output device, the person, who sees the images, is capable of seeing the original images on the image output device. With the image understanding aiding system in accordance with the present invention, the position matching processing is thus separated from the image output device, and the function of the conventional image displaying system is not lost. Also, with the image understanding aiding system in accordance with the present invention, since the position matching processing itself is performed by the image position matching apparatus, it is sufficient for the image output device to adjust the output position of at least either one of the two original images in accordance with the result of the position matching processing, i.e. the aforesaid information, which represents the translation quantity. Accordingly, the processing efficiency of the entire system is capable of being kept high.

As described above, with the image understanding aiding system in accordance with the present invention, the image position matching apparatus and the image output device are separated from each other, and the position matching processing is incorporated at the optimum position within the image understanding work flow. Also, the processing efficiency of the entire system is enhanced. Further, it is possible for the original images to be supplied into the image output device, and the conventional need of the person, who sees the images, is capable of being satisfied. The image understanding aiding system in accordance with the present invention is thus highly advantageous in practice.

However, in the cases of the conventional image output device, which does not have the function for adjusting the output position of at least either one of the two original images in accordance with the aforesaid information representing the translation quantity, and which directly outputs the inputted images, even though the information, which represents the translation quantity obtained from the position matching processing, and the two original images are supplied into the conventional image output device, the conventional image output device is not capable of outputting the position matching-processed images. Therefore, with the modification of the image understanding aiding system in accordance with the present invention, the image position matching apparatus selectively supplies the set of the information, which represents the translation quantity, and the two original images, and/or the set of position matching-processed images into the image output device in accordance with the request of the image output device. With the modification described above, in cases where the image output device which is the supply destination is the image output device capable of outputting the position matching-processed images in accordance with the information, which represents the translation quantity, and the two original images, the image position matching apparatus is capable of supplying the information, which represents the translation quantity, and the two original images into the image output device. Also, in cases where the image output device which is the supply destination is the conventional image output device that is not capable of outputting the position matching-processed images in accordance with the information, which represents the translation quantity, and the two original images, the image position matching apparatus is capable of supplying the position matching-processed images into the conventional image output device. Accordingly, it becomes possible for the conventional image output device to be incorporated into the image understanding aiding system, and the flexibility of the image understanding aiding system is capable of being enhanced.

Further, in cases where the position matching processing means of the image position matching apparatus selectively forms the information, which represents the translation quantity, and/or the position matching-processed images in accordance with the request of the external device, such as the image output device, since the position matching-processed images are formed only when necessary, the processing efficiency is capable of being enhanced even further.

Furthermore, the position matching processing may be the automatic position matching processing, in which the reference area in at least either one of the two original images is detected, and in which the processing for aligning the position of the detected reference area is performed automatically. In the image understanding work flow described above, the plurality of the original images are sent successively from the modality into the image position matching apparatus. Therefore, in cases where the position matching processing is performed as the automatic position matching processing described above, the plurality of the original images, which are sent successively from the modality, are capable of being processed quickly and efficiently without stagnation.

Also, the position matching processing may be the combination of the automatic position matching processing and the correction processing for manually correcting the result of the automatic position matching processing. In such cases, by the provision of both the automatic position matching processing and the manual position matching processing (i.e., the correction processing), the accuracy and the efficiency, with which the position matching processing is performed, are capable of being enhanced even further. For example, in the cases of the position matching processing on the two original images of a pair of the right and left breasts acting as the objects in the medical radiation images, in which nipple patterns are taken as the reference areas, if the position matching processing is not performed, the positions of the right and left breasts will match with each other only in approximately 60% of the cases. Therefore, considerable time and labor will be required to perform manual position matching processing with respect to the remaining approximately 40% of the cases, and the burden to the operator for performing the position matching processing will not be capable of being kept light. However, in cases where the automatic position matching processing is performed, the positions of the right and left breasts match with each other in approximately 90% of the cases, and the burden to the operator for performing the position matching processing is capable of being kept light. In the remaining approximately 10% of the cases, in which the positions of the right and left breasts do not match with each other with the automatic position matching processing, for example, the original images are of a patient having asymmetric breasts, such as the breasts having been deformed due to a disease or a surgical operation, or are the images in which the nipple patterns are not embedded. With the automatic position matching processing alone, it is not always possible to cope with the cases described above. Therefore, the manual position matching processing is performed with respect to the original images, whose positions could not be matched with each other as a result of the automatic position matching processing, and it thus becomes possible to make individual fine position adjustments in accordance with the experience of the operator and other pieces of information. As described above, both the high position matching efficiency with the automatic position matching processing and the high position matching accuracy with the manual position matching processing are capable of being achieved, and the entire system becomes convenient for use.

BRIEF DESCRIPTION OF THE DRAWINGS

FIG. 7 is a schematic view showing an example of a display screen, on which position matching-processed images are displayed, and from which manual correction processing for image positions is performed, FIG. 11 is a diagram showing an example of a distribution destination managing table.

DESCRIPTION OF THE PREFERRED EMBODIMENTS

The present invention will hereinbelow be described in further detail with reference to the accompanying drawings.

Figure 1:
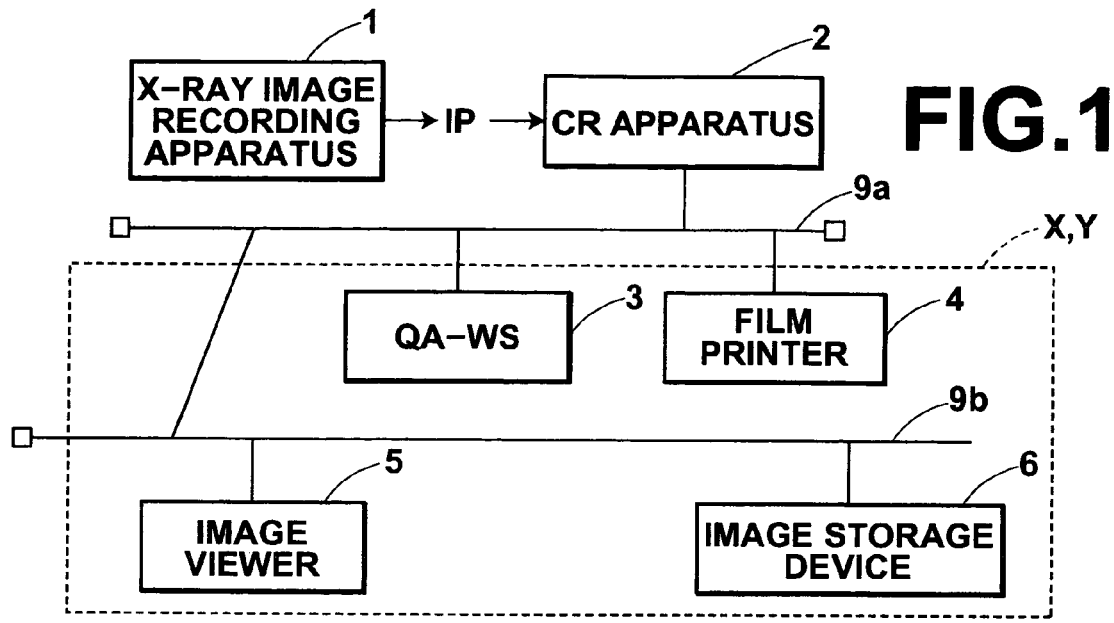
FIG. 1 is a block diagram showing a radiology information system, in which a first embodiment of the image understanding aiding system in accordance with the present invention is employed.

An image understanding aiding system X, which is a first embodiment of the image understanding aiding system in accordance with the present invention, constitutes part of a radiology information system (RIS). The image understanding aiding system X aids comparison and understanding of original radiation images (mammograms) P1 and P2 of a pair of right and left breasts. FIG. 1 is a block diagram showing a radiology information system, in which a first embodiment of the image understanding aiding system in accordance with the present invention is employed. As illustrated in FIG. 1, the radiology information system comprises an X-ray image recording apparatus 1. The radiology information system also comprises a computed radiography (CR) apparatus 2, which constitutes an image forming system (i.e., a modality). The radiology information system further comprises the image understanding aiding system X, which is the first embodiment of the image understanding aiding system in accordance with the present invention. The image understanding aiding system X comprises a quality assurance workstation (QA-WS) 3, a film printer 4, an image viewer 5, and an image storage device 6. The X-ray image recording apparatus 1, the CR apparatus 2, the QA-WS 3, the film printer 4, the image viewer 5, and the image storage device 6 are connected to a network 9.

The X-ray image recording apparatus 1 performs image recording operations for recording radiation images of objects on stimulable phosphor sheets IP, IP, . . . , each of which is provided with a sheet-shaped stimulable phosphor layer.

The CR apparatus 2 performs an image read-out operation on each of the stimulable phosphor sheets IP, IP, . . . , on which the radiation images have been recorded with the X-ray image recording apparatus 1. With the image read-out operation, each of the stimulable phosphor sheets IP, IP, . . . , on which the radiation images have been recorded with the X-ray image recording apparatus 1, is exposed to stimulating rays, such as a laser beam, which cause the stimulable phosphor sheet IP to emit light in proportion to the amount of energy stored on the stimulable phosphor sheet IP during the exposure of the stimulable phosphor sheet IP to radiation. Also, the light having been emitted by the stimulable phosphor sheet IP is photoelectrically detected, and an analog image signal is thereby acquired. The thus acquired analog image signal is then converted into a digital image signal. From the image read-out operations, a digital original image signal P1, which represents the original image P1, and a digital original image signal P2, which represents the original image P2, are formed. (Both the image and the image signal representing the image will hereinbelow be represented by the same reference numeral.)

The QA-WS 3 is constituted of a computer. The QA-WS 3 has the function for performing normalization processing (i.e., exposure data recognizer (EDR) processing) and image quality adjusting processing on each of the digital original image signals P1 and P2, which are successively sent from the CR apparatus 2. The QA-WS 3 also has the function for performing position matching processing with the image position matching apparatus in accordance with the present invention. The QA-WS 3 further has the function for acquiring patient and examination information Q and output device information R concerning the image output device which is the destination of distribution, and distributing the processed image signals, the patient and examination information Q, and the like, into the image output device which is the destination of distribution, such that it is clear which processed image signal corresponds to which patient and examination information Q, and the like. The QA-WS 3 is provided with main body hardware devices, such as a CPU, a main storage device (memory) for storing the image signals, and the like, an external subsidiary storage device (e.g., a hard disk), and a network interface. The QA-WS 3 is also provided with various kinds of control programs, such as an OS, input devices, such as keyboards and mouse devices, from which requests from the operators are to be inputted, and display devices for displaying visible images.

Figure 2:
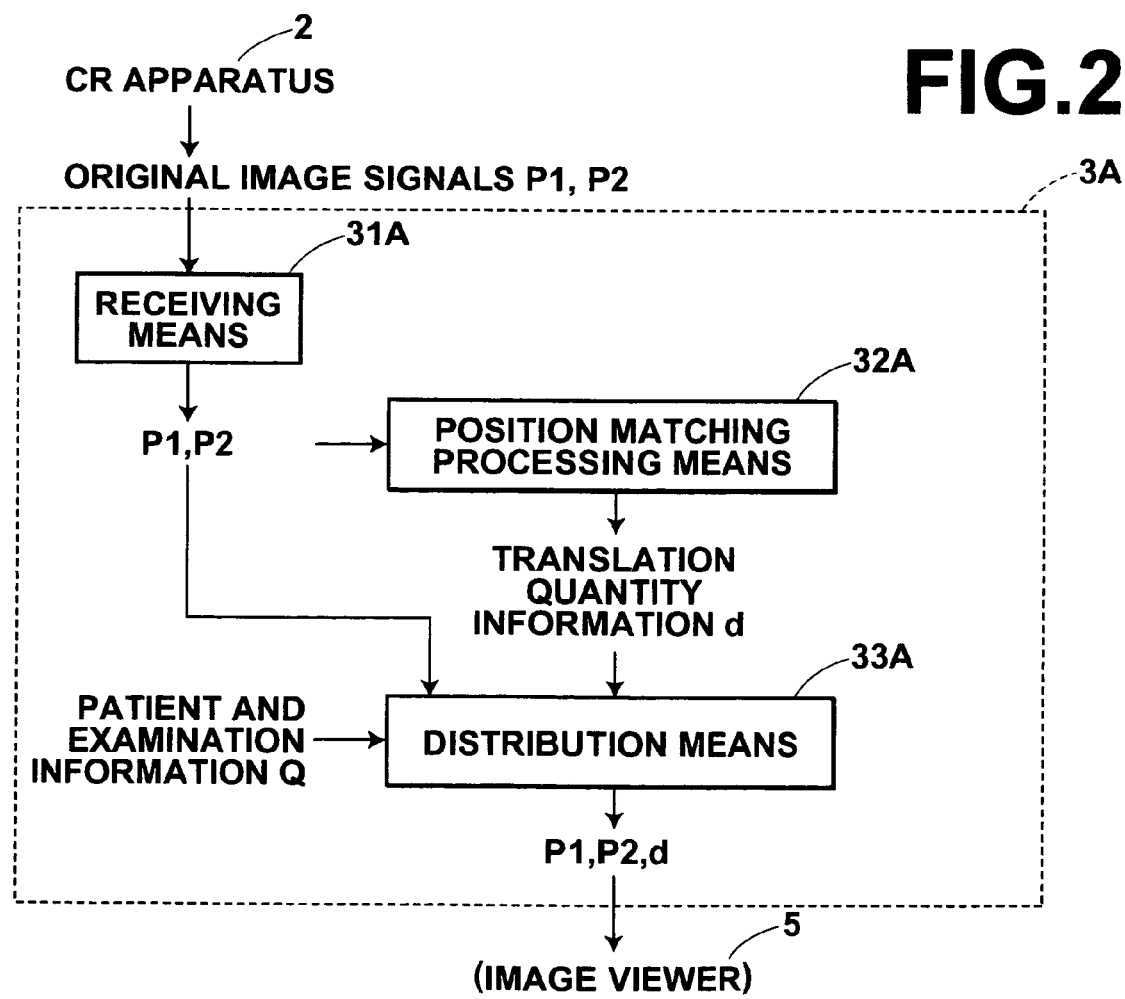
FIG. 2 is a block diagram showing a first embodiment of the image position matching apparatus in accordance with the present invention.

FIG. 2 is a block diagram showing an image position matching apparatus 3A, which is a first embodiment of the image position matching apparatus in accordance with the present invention. The image position matching apparatus 3A is incorporated in the QA-WS 3. As illustrated in FIG. 2, the image position matching apparatus 3A comprises receiving means 31A, position matching processing means 32A, and distribution means 33A. The receiving means 31A receives the original image signal P1, which represents the original image P1 of one of the pair of the right and left breasts to be compared with each other, and the original image signal P2, which represents the original image P2 of the other breast. The position matching processing means 32A performs the position matching processing on the two original images P1 and P2 in cases where the two original images P1 and P2 are to be outputted such that the two original images P1 and P2 are located in a line along the horizontal direction so as to stand back to back with each other. The position matching processing comprises vertical translation of the original image P1, such that the positions of nipple patterns embedded in the two original images P1 and P2, which positions are taken with respect to the vertical direction, align with each other. Also, the position matching processing means 32A forms information, which represents a translation quantity d for aligning the positions of the nipple patterns in the two original images P1 and P2 with each other. The distribution means 33A specifies the image output device, which is the destination of the distribution of the information representing the translation quantity d and the two original images P1 and P2, in accordance with the patient and examination information Q corresponding to the two original images P1 and P2. Also, the distribution means 33A distributes the information, which represents the translation quantity d, and the two original images P1 and P2 into the specified image output device, such as the film printer 4 or the image viewer 5, which is the destination of the distribution, through networks 9a and 9b. The image position matching apparatus 3A is controlled with computer programs for causing the QA-WS 3 to act as the receiving means 31A, the position matching processing means 32A, and the distribution means 33A.

The original image signals P1 and P2 are sent from the CR apparatus 2 through the network 9a. After the original image signals P1 and P2 have been received by the receiving means 31A, the original image signals P1 and P2 are stored in the memory of the QA-WS 3.

The patient and examination information Q may be sent from a device (not shown) for inputting the patient information, an examination order, and the like. Alternatively, the QA-WS 3 may be provided with a data base for registering and managing the received information, and the patient and examination information Q may be acquired from the data base. As another alternative, the QA-WS 3 may be provided with an interface, such as a display screen, from which the patient and examination information Q is capable of being inputted. and the patient and examination information Q may be inputted from the interface. The patient and examination information Q is stored in the memory of the QA-WS 3.

The film printer 4 prints out the images, which are represented by the image signals having been distributed from the QA-WS 3, on film, such as film having a size of 14"×17", film having a size of 14"×14", film having a size of B4, or film having a size of 8"×10".

Figure 3:
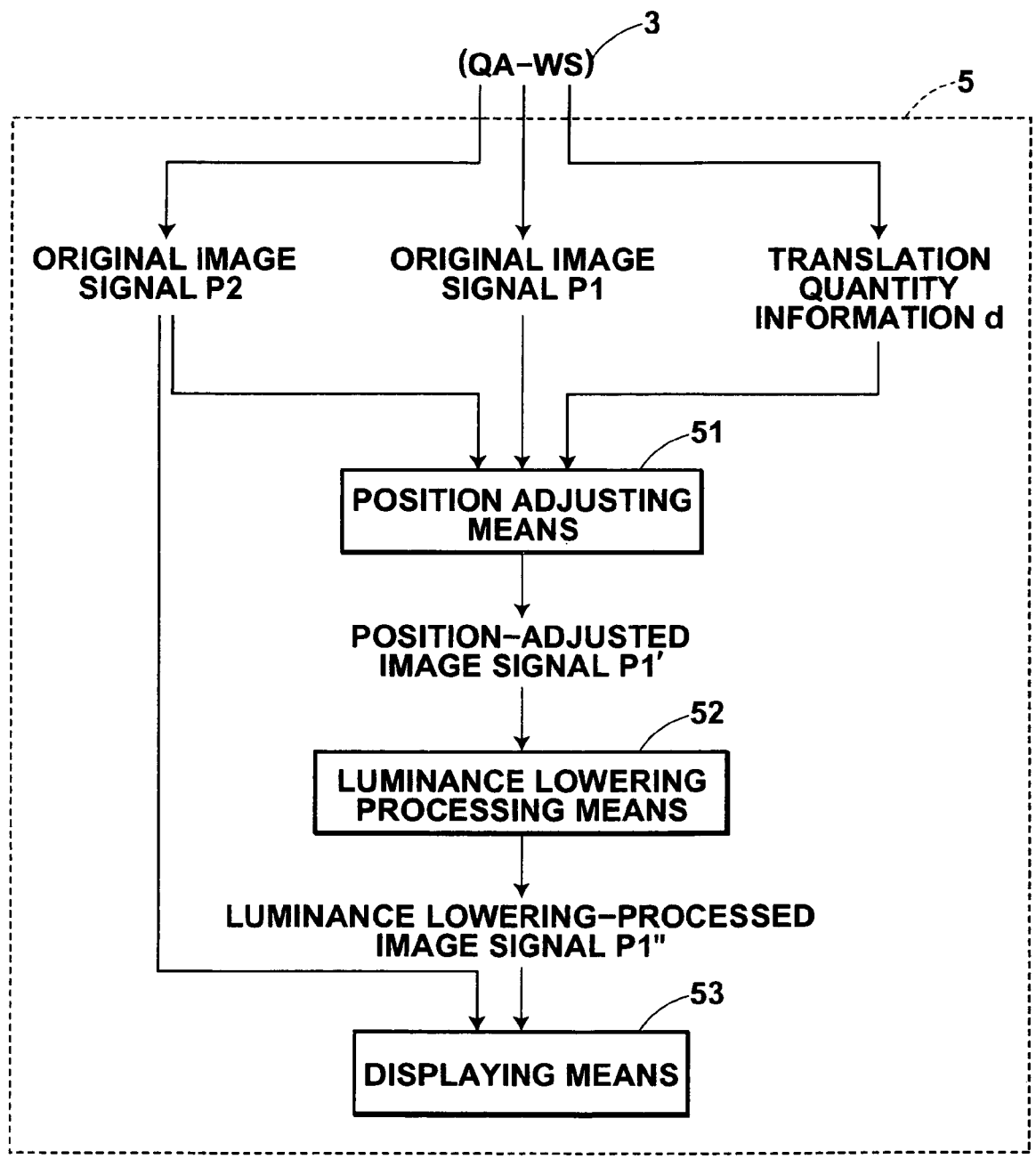
FIG. 3 is a block diagram showing an image viewer, which is an embodiment of the image output device in accordance with the present invention.

The image viewer 5 is a computer for displaying the images, which are represented by the image signals having been distributed from the QA-WS 3, on a display device. FIG. 3 is a block diagram showing the image viewer 5, which is an embodiment of the image output device in accordance with the present invention. As illustrated in FIG. 3, the image viewer 5 comprises position adjusting means 51, luminance lowering processing means 52, and displaying means 53. The position adjusting means 51 adjusts the displaying position of the original image P1 in cases where the original images P1 and P2 are to be displayed, such that the original images P1 and P2 are located in a line so as to stand back to back with each other, in accordance with the original image signals P1 and P2 and the information (hereinbelow referred to as the translation quantity information) representing the translation quantity, which have been distributed from the QA-WS 3. The luminance lowering processing means 52 lowers the luminance of a loss area of a position-adjusted image P1', which loss area occurs in cases where the position-adjusted image P1' and the original image P2 are displayed, such that the position-adjusted image P1' and the original image P2 stand back to back with each other. The displaying means 53 displays a luminance lowering-processed image P1", which has been obtained from the luminance lowering processing, and the original image P2, such that the luminance lowering-processed image P1" and the original image P2 are located in a line so as to stand back to back with each other. The image viewer 5 is controlled with computer programs for causing the computer to function as the position adjusting means 51, the luminance lowering processing means 52, and the displaying means 53. Also, the image viewer 5 is capable of performing the displaying of arbitrary images, which are represented by arbitrary image signals, such as the original images P1 and P2, on the display screen. Further, the image viewer 5 is capable of performing various kinds of image processing, such as image size enlargement processing, image size reduction processing, image rotation processing, alteration of luminance and contrast, extraction of a local area limited image region, size enlargement processing of a local area limited image region, and size reduction processing of a local area limited image region. Further, the image viewer 5 is capable of performing addition of comments with letters and figures, and measurements of a distance and an angle of an arbitrary image area.

The image storage device 6 is a computer for storing and managing the image signals in an image data base. The image storage device 6 is provided with a large-capacity external storage device and data base managing software functions, such as object relational data base managing software functions.

The network 9a is the network, which is located in an image recording room. The CR apparatus 2 and the QA-WS 3 are connected to the network 9a. The network 9b is the trunk network. The network 9b is connected to the network 9a, which is located in the image recording room. The network 9b is also connected to the network, which is located in an image diagnosis room and connected to the image viewer 5. The network 9b is further connected to the network, which is located in a server room and connected to the image storage device 6. The communication through the network 9a and the network 9b is performed in accordance with a protocol, such as the protocol referred to as the digital imaging and communications in medicine (DICOM).

How the image understanding aiding system X, which is the first embodiment of the image understanding aiding system in accordance with the present invention, performs processing will be described hereinbelow.

Figure 4:
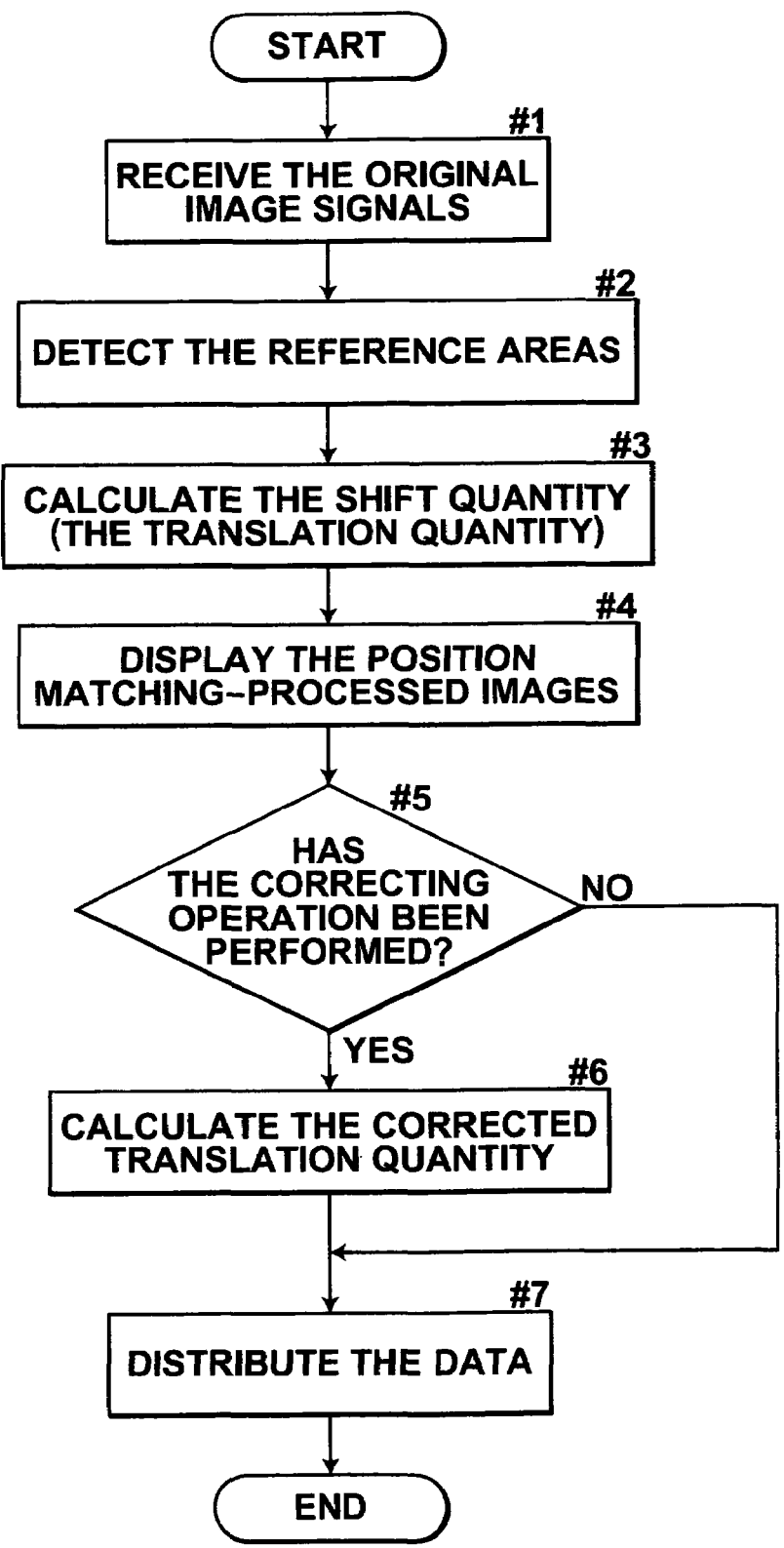
FIG. 4 is a flow chart showing how the first embodiment of the image position matching apparatus in accordance with the present invention performs processing.

FIG. 4 is a flow chart showing how the first embodiment of the image position matching apparatus in accordance with the present invention, i.e. the part of the QA-WS 3 corresponding to the image position matching apparatus 3A, performs processing. The processing with the QA-WS 3, which will be described below, is performed with computer programs executed in the QA-WS 3.

With reference to FIG. 4, firstly, in a step #1, the receiving means 31A receives the original image signals P1 and P2, which are sent successively from the CR apparatus 2. The received original image signals P1 and P2 are stored in the memory of the QA-WS 3. The original image signal P1 represents the original image P1 of the one of the pair of the right and left breasts of the patient, and the original image signal P2 represents the original image P2 of the other breast of the patient. At the time of the image recording operation, it has been made clear which patient ID code for the identification of the patient corresponds to which IP number for the identification of the stimulable phosphor sheet IP. Therefore, in accordance with the patient ID code, it is capable of specifying which original image signals P1 and P2 correspond to which patient.

Figure 5:
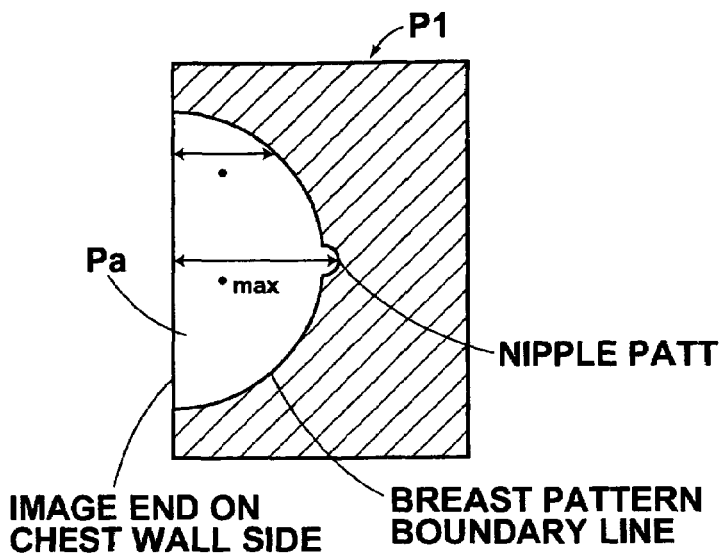
FIG. 5 is an explanatory view showing processing for detecting a nipple pattern.

Thereafter, in a step #2, the position matching processing means 32A acquires the original image signals P1 and P2, which have been subjected to the normalization processing performed by the QA-WS 3, from the memory of the QA-WS 3 and detects the nipple patterns, which are embedded in the original images P1 and P2, as the reference areas in accordance with the acquired original image signals P1 and P2. Specifically, as illustrated in FIG. 5, a boundary line between a breast pattern Pa and a background region is detected with an edge detecting technique, or the like. Also, the part of the boundary line, at which part a distance l from an image end on a chest wall side is largest, (i.e., a vertex of the semicircular boundary line, which vertex is located at the largest distance lmax from the image end on the chest wall side) is detected as the nipple pattern. Alternatively, template images representing the nipple patterns may be prepared previously, template matching may be performed with the template images and on each of the original images P1 and P2, and the nipple pattern may thereby be detected.

Figure 6A:
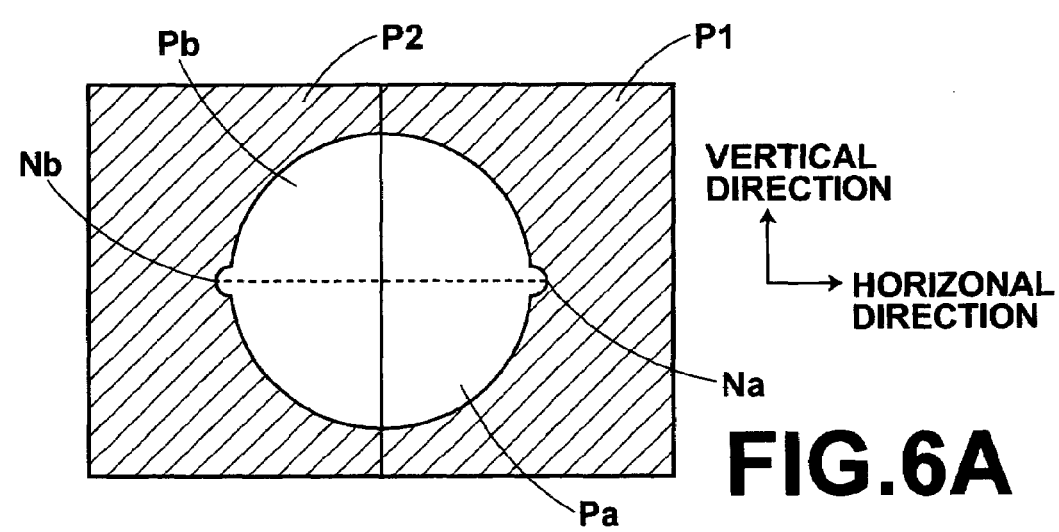
FIGS. 6A and 6B are explanatory views showing how a shift quantity between positions of nipple patterns is calculated.
Figure 6B:
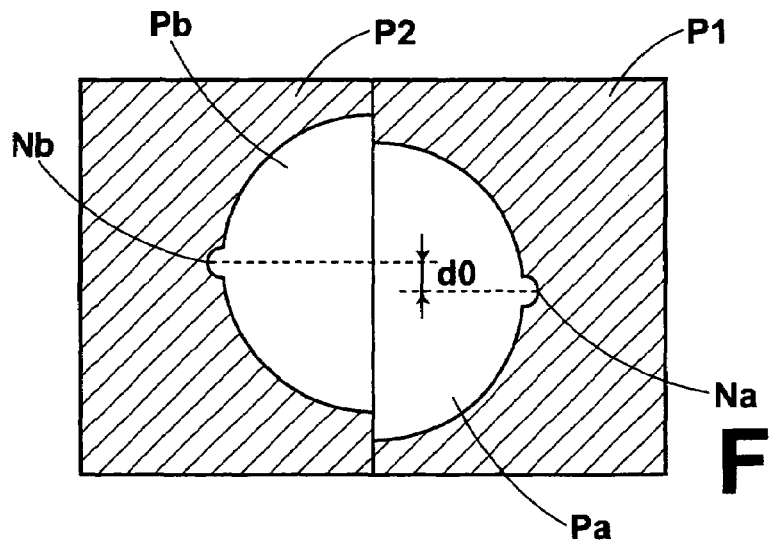

Also, in a step #3, a shift quantity between the positions of the nipple patterns, which have been detected from the original images P1 and P2, is calculated. Specifically, top ends of the original images P1 and P2 are aligned with each other, and the calculation is made in this state to find the difference between the positions of the nipple patterns having been detected from the original images P1 and P2, which difference is taken with respect to the vertical direction. FIGS. 6A and 6B are explanatory views showing how a shift quantity between positions of nipple patterns is calculated. As illustrated in FIG. 6A, in cases where the top ends of the original images P1 and P2 are aligned with each other, and the position of a nipple pattern Na of the breast pattern Pa embedded in the original image P1 and the position of a nipple pattern Nb of a breast pattern Pb embedded in the original image P2, which positions are taken with respect to the vertical direction, align with each other, the shift quantity is taken as being zero. As illustrated in FIG. 6B, in cases where the top ends of the original images P1 and P2 are aligned with each other, and the position of the nipple pattern Na of the breast pattern Pa embedded in the original image P1 and the position of the nipple pattern Nb of the breast pattern Pb embedded in the original image P2, which positions are taken with respect to the vertical direction, shift by a difference d0 from each other, the difference d0 is taken as the shift quantity. With the subsequent processing, the original image P1 is translated by the shift quantity d0. Therefore, the information representing the shift quantity is referred to as the translation quantity information.

Further, in a step #4, the position matching-processed images, which have been obtained from the position matching processing, are displayed on the display device of the QA-WS 3. At this time, the original image P1 is vertically translated by the translation quantity d0, such that the positions of the nipple patterns having been detected in the step #2 align with each other, and the position matching-processed images are thereby displayed. FIG. 7 is a schematic view showing an example of a display screen of the display device of the QA-WS 3, on which position matching-processed images are displayed, and from which manual correction processing for image positions is performed. As illustrated in FIG. 7, the position matching processing means 32A performs the image size reduction processing for reducing the image size of each of the position matching-processed images of the right and left breasts to the images size of each of images 101, 102, 103, 104, 105, and 106. Also, the position matching processing means 32A displays the images having the reduced image sizes successively on a region 100 at the lower part of the display screen and in units of a set of the position matching-processed images of the right and left breasts (i.e., in units of each of the set of the images 101 and 102, the set of the images 103 and 104, and the set of the images 105 and 106), such that the images having the reduced image sizes flow at predetermined time intervals in the direction indicated by the arrow D1. The upper part of the display screen will be described later.

The operator of the QA-WS 3 sees the images, which are successively displayed on the lower part 100 of the display screen illustrated in FIG. 7, and checks the image quality of the displayed images. The operator of the QA-WS 3 also checks whether the positions of the reduced-size images of the right and left breasts have been or have not been correctly matched with each other. As for the set of the reduced-size images, which have appropriate image quality and whose positions have been correctly matched with each other, as in the cases of the set of the reduced-size images 101 and 102 or the set of the reduced-size images 105 and 106, the operator need not perform a particular operation, and the reduced-size images flow in the direction indicated by the arrow D1.

As for the set of the reduced-size images, whose positions have not been correctly matched with each other, as in the cases of the set of the reduced-size images 103 and 104, the operator operates the mouse device of the QA-WS 3 in order to indicate either one of the images constituting the set of the reduced-size images with a pointer 120 and to drag the indicated image. The operator thus drops the dragged image into a region 110 at the upper part of the display screen. In accordance with the operation described above, the QA-WS 3 performs the image size enlargement processing for enlarging the image sizes of the reduced-size images 103 and 104 into the image sizes corresponding to the size of the region 110 at the upper part of the display screen and displays the thus obtained enlarged-size images 111 and 112 on the region 110 at the upper part of the display screen. Thereafter, the operator drags either one of the enlarged-size images 111 and 112 in order to translates the image vertically. The operator thus manually adjusts the position of either one of the enlarged-size images 111 and 112. In the example of FIG. 7, the enlarged-size image 112 is translated in the direction indicated by the arrow D2. After the manual position adjustment has been finished in the manner described above, the operator operates the mouse device in order to locate the pointer 120 at a correction executing button 121, clicks the mouse device, and thereby pushes down the correction executing button 121.

In cases where the operator judges that the image quality is bad, the operator may pushes down a re-recording instruction button 122 in order to give an instruction for the re-recording operation for the corresponding image. Also, the operator may push down a subsidiary information display button 123 in order to display subsidiary information, which represents the patient, the examination, and details of the image, in accordance with the patient ID code and the IP number for the identification of the stimulable phosphor sheet IP, which correspond to the image. Further, the operator may push down a halt/restart button 124 in order to halt the flow of the reduced-size images, which are successively displayed, in the direction indicated by the arrow D1, or in order to restart the flowing of the reduced-size images from the halted state.

In a step #5, the QA-WS 3 makes a judgment as to whether the correcting operation has or has not been performed. In cases where it has been judged that the correcting operation has been performed, i.e. in cases where it has been judged that the correction executing button 121 has been pushed down, in a step #6, the QA-WS 3 calculates a corrected translation quantity d. Specifically, the QA-WS 3 acquires a quantity d1', by which the enlarged-size image 111 or the enlarged-size image 112 has been translated with the manual position adjustment described above. Also, the QA-WS 3 calculates a translation quantity d1 in the corresponding original image, which translation quantity d1 corresponds to the quantity d1' described above, in accordance with the image size reduction factor between the corresponding original image and the enlarged-size image 111 or the enlarged-size image 112. Further, the QA-WS 3 adds the thus calculated translation quantity d1 and the translation quantity d0, which was calculated in the step #3, to each other (or the QA-WS 3 subtracts the thus calculated translation quantity d1 and the translation quantity d0, which was calculated in the step #3, from each other). The QA-WS 3 thus calculates the corrected translation quantity d.

Thereafter, in a step #7, the distribution means 33A specifies the image output device, which is the destination of the distribution, in accordance with the patient and examination information Q corresponding to the two original image signals P1 and P2. Also, the distribution means 33A distributes the information, which represents the corrected translation quantity d, and the two original image signals P1 and P2 into the specified image output device. The patient and examination information Q is classified into the patient information and the examination information. The examination information contains an examination ID code for the identification of the examination and information representing details of the examination, which information corresponds to the examination ID code. The details of the examination contain the patient ID code, the object site of the examination, the date and hour of the examination, the requester, and the distribution destination ID code for the identification of the image output device which is the destination of the distribution. The patient information contains the patient ID code for the identification of the patient and information representing attributes of the patient, which information corresponds to the patient ID code. The attributes of the patient contain the name of the patient, the age of the patient, and the distinction of sex of the patient. Therefore, in cases where reference is made to the patient information in accordance with the patient ID code, which is contained in the examination information, reference is capable of being made to the detailed information concerning the patient subjected to the examination. The distribution means 33A acquires the distribution destination ID code from the examination information corresponding to the two original image signals P1 and P2 and distributes the information, which represents the corrected translation quantity d, and the two original image signals P1 and P2 into the image output device (in this example, the image viewer 5), which is specified by the distribution destination ID code.

Figure 8A:
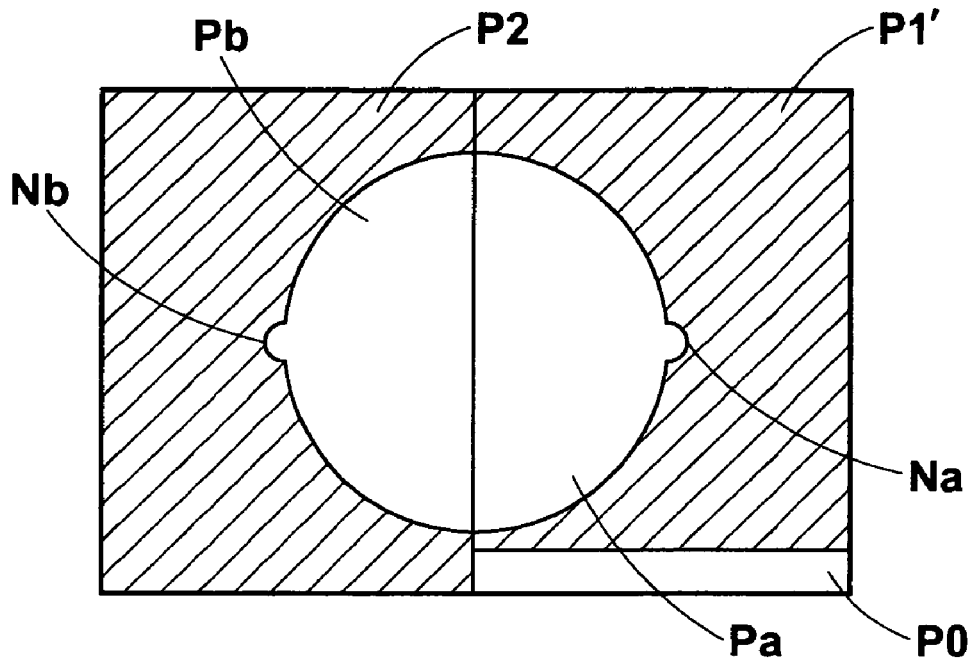
FIGS. 8A and 8B are explanatory views showing how luminance lowering processing is performed on the position matching-processed images.
Figure 8B:
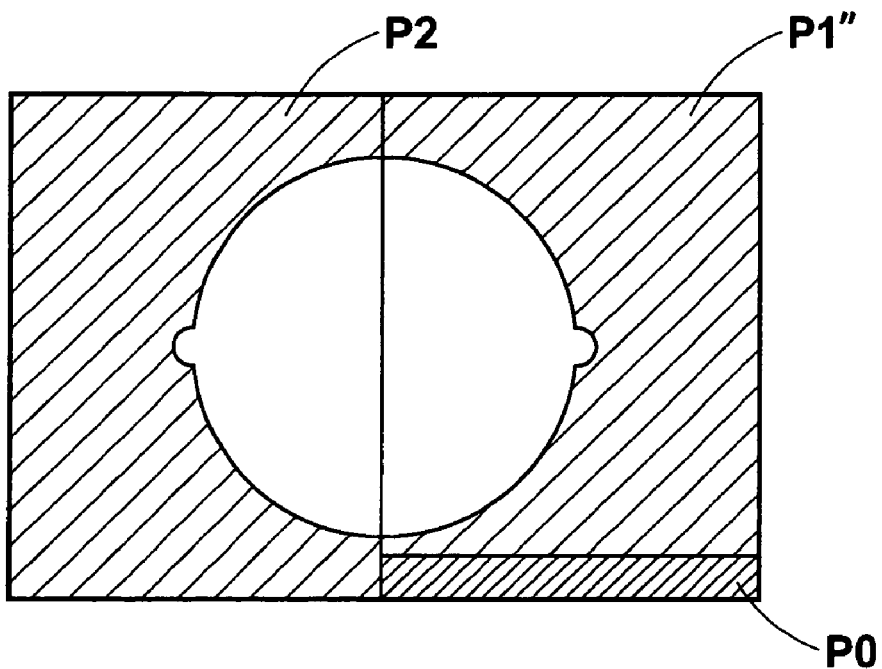

The image viewer 5 receives the two original image signals P1 and P2 and the translation quantity information d from the QA-WS 3. Also, as illustrated in FIG. 8A, the position adjusting means 51 of the image viewer 5 forms the position-adjusted image signal P1' representing the position-adjusted image P1', in which the original image P1 has been translated vertically by the translation quantity d. However, in such cases, the image information in a region P0 illustrated in FIG. 8A will be lost due to the translation of the original image P1, and the region P0 will be displayed with the highest luminance (i.e., the lowest image density). In such cases, due to the glaringness of the region P0, it will be difficult for the person, who sees the displayed image, to perform the image understanding operation. Therefore, as illustrated in FIG. 8B, the luminance lowering processing means 52 performs the processing for lowering the luminance of the region P0 to the lowest luminance (i.e., the processing for increasing the image density of the region P0 to the highest image density) and forms the luminance lowering-processed image signal P1". Also, the displaying means 53 of the image viewer 5 displays the luminance lowering-processed image P1" and the original image P2, such that the luminance lowering-processed image P1" and the original image P2 are located in a line. As a result, as illustrated in FIG. 8B, the images of the right and left breasts are displayed, such that the positions of the nipple patterns embedded in the images align with each other.

As described above, with the image understanding aiding system X, which is the first embodiment of the image understanding aiding system in accordance with the present invention, the position matching processing is incorporated at the optimum position within the image understanding work flow, which comprises the image formation (with the X-ray image recording apparatus 1 and the CR apparatus 2), the image adjustment (with the QA-WS 3), and the image output (with the image viewer 5, or the like). Specifically, in lieu of the position matching processing being performed by the image output device, such as the film printer 4 or the image viewer 5, the position matching processing is performed as the preliminary processing by the QA-WS 3. Therefore, in cases where the same pair of the images P1 and P2 are to be outputted on a plurality of image output devices, the same position matching processing need not be performed by each of the image output devices. Accordingly, as the entire system, the efficiency of the processing is capable of being kept high.

Also, with the image understanding aiding system X, the distribution means 33A of the image position matching apparatus 3A distributes each of the original image signals P1 and P2 and the translation quantity information d into the image viewer 5. Therefore, on the side of the image viewer 5, the position-adjusted image P1' is capable of being obtained with the position adjusting means 51, and the luminance lowering-processed image P1" obtained from the luminance lowering processing means 52 is capable of being displayed on the display screen. Also, it is possible for the image viewer 5 to display the original images P1 and P2 directly or to perform the image processing on the original images P1 and P2. Therefore, as in the cases of the conventional image displaying systems, in which the position matching processing has been performed on the original images, it is possible for the image output device to keep the functions for displaying the original images, performing the image processing, and the like. Further, with the image understanding aiding system X, since the position matching processing itself is performed by the image position matching apparatus 3A of the QA-WS 3, it is sufficient for the image viewer 5 to adjust the output position of at least either one of the two original images. Accordingly, the processing efficiency of the entire system is capable of being kept high.

Further, with the image understanding aiding system X, the image position matching apparatus 3A automatically detects the positions of the nipple patterns acting as the reference areas for the position matching processing and automatically calculates the shift quantity between the positions of the nipple patterns in the two original images. Therefore, in the image understanding work flow, the plurality of the original images, which are sent successively from the image forming system, are capable of being processed quickly and efficiently without stagnation.

Furthermore, with the image understanding aiding system X, after the image position matching apparatus 3A has performed the automatic position matching processing, the position matching-processed images having been obtained from the automatic position matching processing are capable of being displayed on the display screen, and the operator is capable of performing the manual position correction processing on the displayed position matching-processed images. Therefore, specific image position matching, which is not capable of being performed with the automatic position matching processing, is capable of being performed with the manual position correction processing. Accordingly, the position matching accuracy is capable of being enhanced.

An image understanding aiding system Y, which is a second embodiment of the image understanding aiding system in accordance with the present invention, will be described hereinbelow. The image understanding aiding system Y is constituted such that a single-function image output device, which does not have the function for adjusting the image output positions and is capable of merely printing out the images on a predetermined size of film in accordance with received image signals, is also capable of being incorporated as the system constitution element in the image understanding aiding system Y. The constitution of the image understanding aiding system Y is basically identical with the constitution of the image understanding aiding system X illustrated in FIG. 1. Differences from the image understanding aiding system X will mainly be described hereinbelow.

Figure 9:
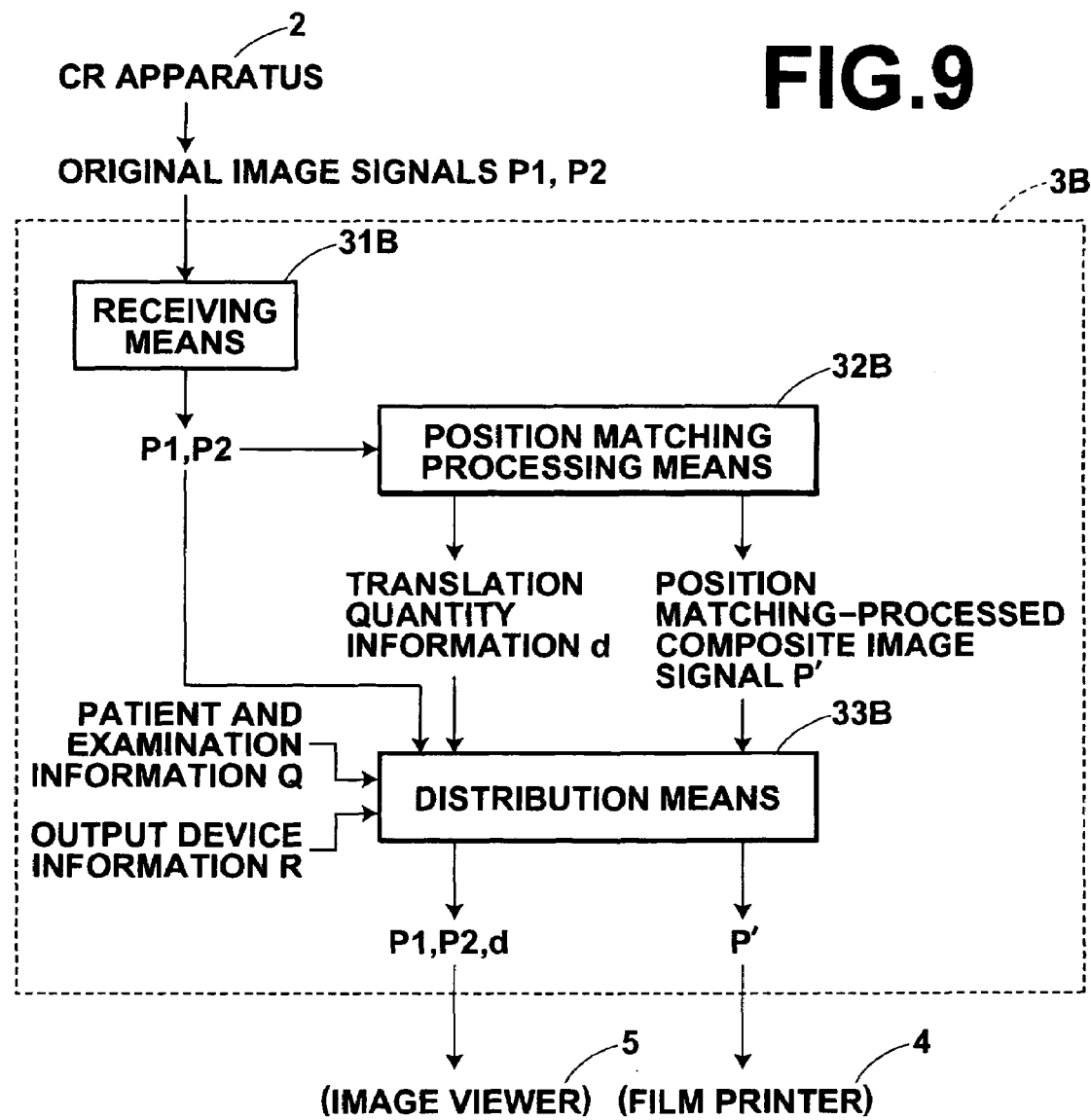
FIG. 9 is a block diagram showing a second embodiment of the image position matching apparatus in accordance with the present invention.

FIG. 9 is a block diagram showing an image position matching apparatus 3B, which is a second embodiment of the image position matching apparatus in accordance with the present invention. In lieu of the image position matching apparatus 3A of the image understanding aiding system X described above, the image position matching apparatus 3B is incorporated in the QA-WS 3 of the image understanding aiding system Y. The image position matching apparatus 3B operates basically in the same manner as that for the image position matching apparatus 3A, except for the features described below. Specifically, as illustrated in FIG. 9, as in the cases of the position matching processing means 32A of the image position matching apparatus 3A, position matching processing means 32B of the image position matching apparatus 3B forms the information, which represents the translation quantity d for aligning the positions of the nipple patterns in the two original images P1 and P2 with each other. Also, the position matching processing means 32B of the image position matching apparatus 3B forms a position matching-processed composite image P', which has been composed from the position matching-processed images, such that the position matching-processed images of the right and left breasts are located in a line so as to stand back to back with each other. (The combination of the information, which represents the translation quantity d, and the position matching-processed composite image P' will hereinbelow be referred to as the result of the position matching processing.) Further, distribution means 33B of the image position matching apparatus 3B specifies the image output device, which is the destination of the distribution of the result of the position matching processing and the original images P1 and P2, in accordance with the patient and examination information Q corresponding to the two original images P1 and P2. Furthermore, the distribution means 33B of the image position matching apparatus 3B acquires the output device information R representing the contents of the result of the position matching processing, which contents are requested from the image output device that is the destination of the distribution. In accordance with the acquired output device information R, the distribution means 33B selectively distributes the set of the information, which represents the translation quantity d, and the two original images P1 and P2, and/or the position matching-processed composite image P' into the image output device, which is the destination of the distribution, such as the image viewer 5 or the film printer 4, through the networks 9a and 9b. The output device information R is set previously in a setting file of the QA-WS 3 and is stored on a hard disk. At the time of the processing, the contents of the setting are loaded into the memory. Details of the output device information R will be described later. The image position matching apparatus 3B is controlled with computer programs for causing the QA-WS 3 to function as receiving means 31B, the position matching processing means 32B, and the distribution means 33B.

How the image understanding aiding system Y, which is the second embodiment of the image understanding aiding system in accordance with the present invention, performs processing will be described hereinbelow.

Figure 10:
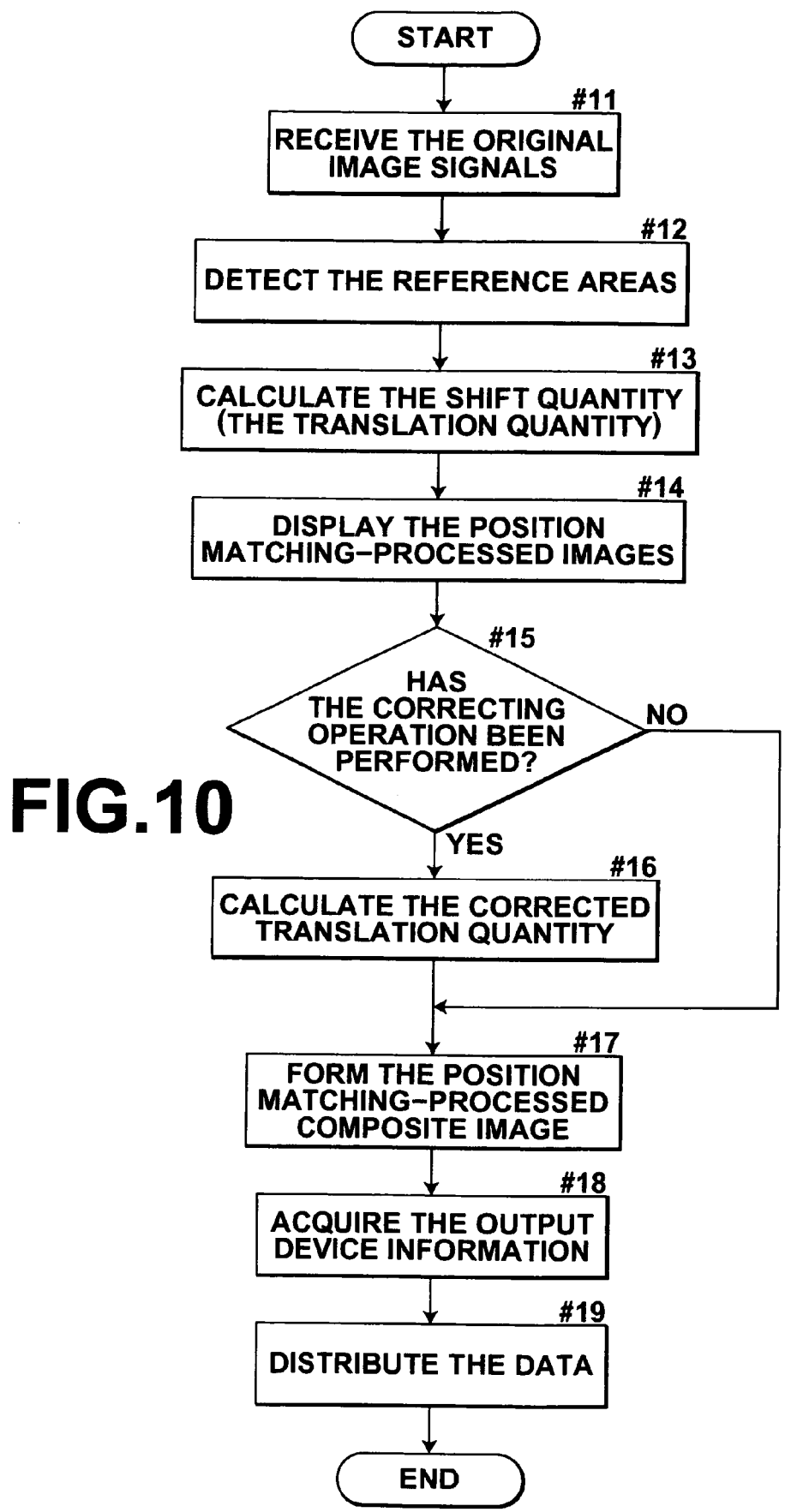
FIG. 10 is a flow chart showing how the second embodiment of the image position matching apparatus in accordance with the present invention performs processing.
Figure 12:
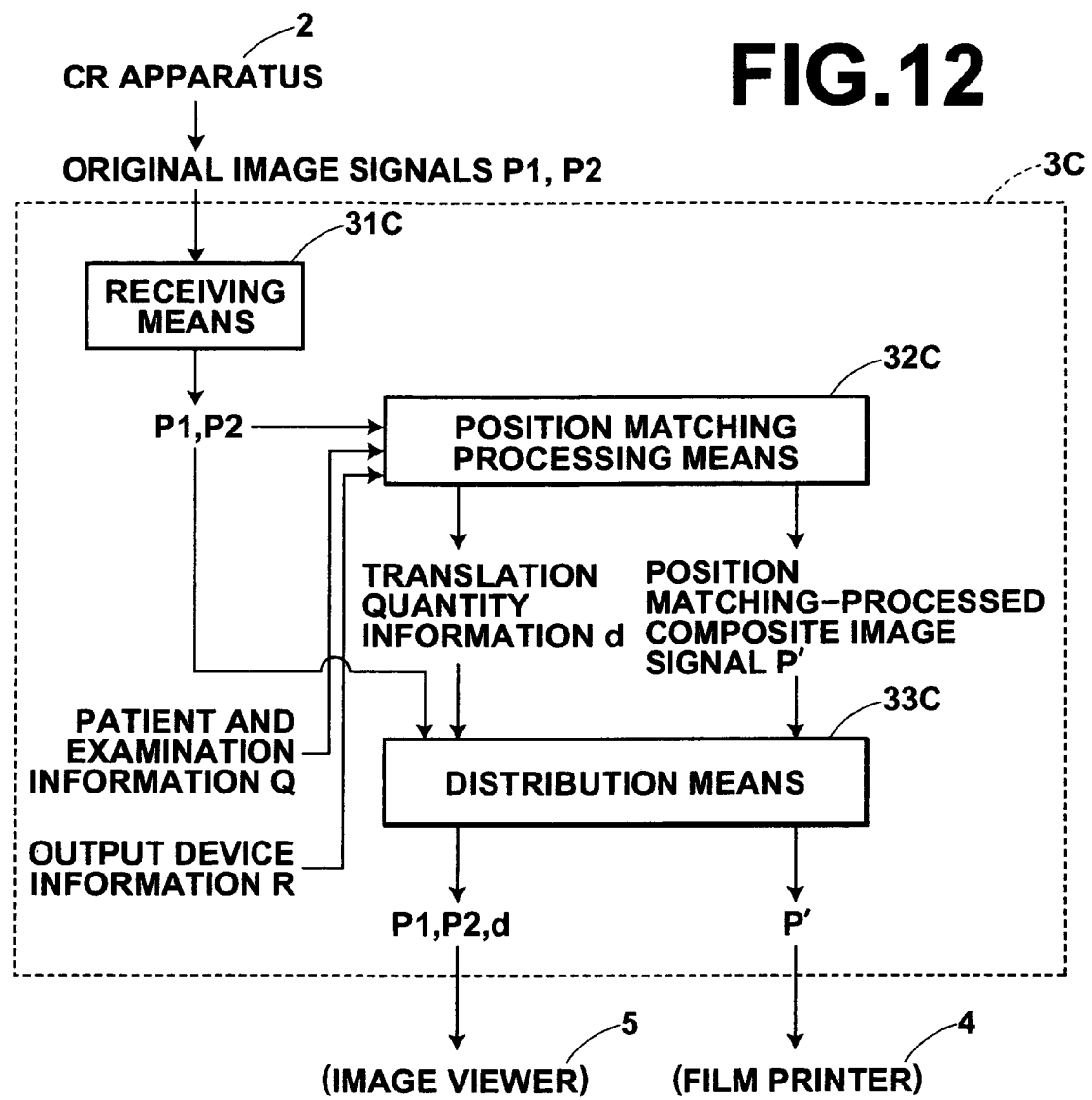
FIG. 12 is a block diagram showing a different embodiment of the image position matching apparatus in accordance with the present invention.

FIG. 10 is a flow chart showing how the second embodiment of the image position matching apparatus in accordance with the present invention, i.e. the part of the QA-WS 3 corresponding to the image position matching apparatus 3B, performs processing in accordance with computer programs executed in the QA-WS 3.

With reference to FIG. 10, the processes in a step #11 to a step #16 are identical with the processes in the step #1 to the step #6 illustrated in FIG. 4 for the image position matching apparatus 3A, which is the first embodiment of the image position matching apparatus in accordance with the present invention.

The position matching processing means 32B performs the processes in the step #11 to the step #16. In the step #16, the position matching processing means 32B calculates the corrected translation quantity d. Thereafter, in a step #17, the position matching processing means 32B forms the position matching-processed composite image P' in accordance with the original image signals P1 and P2 and the corrected translation quantity d. Specifically, the position matching processing means 32B locates the original images P1 and P2 in a line, such that the images of the right and left breasts stand back to back with each other. Also, the position matching processing means 32B vertically translates the original image P1 by the translation quantity d, such that the positions of the nipple patterns embedded in the original images P1 and P2 align with each other. The position matching processing means 32B thus forms the position matching-processed composite image P', which has been composed from the position matching-processed images. More specifically, the position matching processing means 32B composes the single image signal from the image signals, which represent the images as illustrated in FIG. 8A. However, in such cases, the image information in the region P0 illustrated in FIG. 8A will be lost due to the translation of the original image P1, and the region P0 will be displayed with the highest luminance (i.e., the lowest image density). In such cases, due to the glaringness of the region P0, it will be difficult for the person, who sees the displayed image, to perform the image understanding operation. Therefore, as illustrated in FIG. 8B, the position matching processing means 32B performs the processing for lowering the luminance of the region P0 to the lowest luminance (i.e., the processing for increasing the image density of the region P0 to the highest image density). In this manner, the image understanding performance is enhanced.

Thereafter, in a step #18, the distribution means 33B acquires the output device information R, which concerns the image output device that is the destination of the distribution, in accordance with the patient and examination information Q corresponding to the original image signals P1 and P2. The distribution means 33B acquires the distribution destination ID code from the examination information corresponding to the original image signals P1 and P2. Also, the distribution means 33B utilizes the thus acquired distribution destination ID code as a retrieval key and makes reference to a distribution destination managing table, which has been stored in the memory of the QA-WS 3. FIG. 11 is a diagram showing an example of a distribution destination managing table. As illustrated in FIG. 11, the kind of the image output device and the kind of the distributed data are managed with respect to each of the distribution destination ID codes. For example, as for the distribution destination ID code "A", the corresponding image output device is the film printer, and the data to be distributed into the film printer is the image signal representing the position matching-processed composite image P'. As for the distribution destination ID code "B", the corresponding image output device is the image viewer, and the data to be distributed into the image viewer is the set of the original image signals P1 and P2 and the translation quantity information d. In accordance with the result of reference made to the distribution destination managing table, the distribution means 33B distributes the data, which the image output device that is the destination of the distribution requires.

The data having been distributed with the processing performed by the image position matching apparatus 3B is received by the film printer 4 or the image viewer 5. In the explanation made below, it is assumed that the film printer 4 is the film printer corresponding to the distribution destination ID code "A", and the image viewer 5 is the image viewer corresponding to the distribution destination ID code "B".

The film printer 4 receives the image signal representing the position matching-processed composite image P', which has been distributed from the QA-WS 3. Also, the film printer 4 prints out the position matching-processed composite image P' on film having a predetermined size. The film printer 4 does not have the function for adjusting the image output position in accordance with the translation quantity information d. Therefore, if the film printer 4 receives the original image signals P1 and P2 and the translation quantity information d, the film printer 4 will not be capable of performing appropriate processing. Accordingly, in the distribution destination managing table illustrated in FIG. 11, the image signal representing the position matching-processed composite image P' is set as the data to be distributed into the film printer 4.

The image viewer 5 receives the original image signals P1 and P2 and the translation quantity information d, which have been distributed from the QA-WS 3. In the same manner as that for the image viewer 5 in the aforesaid first embodiment of the image position matching apparatus in accordance with the present invention, the image viewer 5 of the image position matching apparatus 3B displays the images of the right and left breasts, in which the positions of the nipple patterns have been aligned with each other.

As described above, with the image understanding aiding system Y, which is the second embodiment of the image understanding aiding system in accordance with the present invention, as in the cases of the image understanding aiding system X, which is the first embodiment of the image understanding aiding system in accordance with the present invention, the efficiency of the processing is capable of being kept high as the entire system. Also, with the image understanding aiding system Y, as in the cases of the conventional image displaying systems, in which the position matching processing has been performed on the original images, it is possible for the image output device to keep the functions for displaying the original images, performing the image processing, and the like. Further, with the image understanding aiding system Y, with respect to the single-function image output device, such as the film printer 4, which does not have the function for adjusting the image output positions and is capable of merely printing out the images on a predetermined size of film in accordance with received image signals, the image signal representing the position matching-processed composite image P' is distributed. Therefore, it is possible for the single-function image output device, such as the film printer 4, to output the images, whose positions have been matched appropriately with each other. Further, with the image understanding aiding system Y, since the aforesaid single-function image output device, such as the film printer 4, is capable of being incorporated as the system constituent element in the image understanding aiding system Y, the flexibility of the image understanding aiding system is capable of being enhanced.

Figure 13:
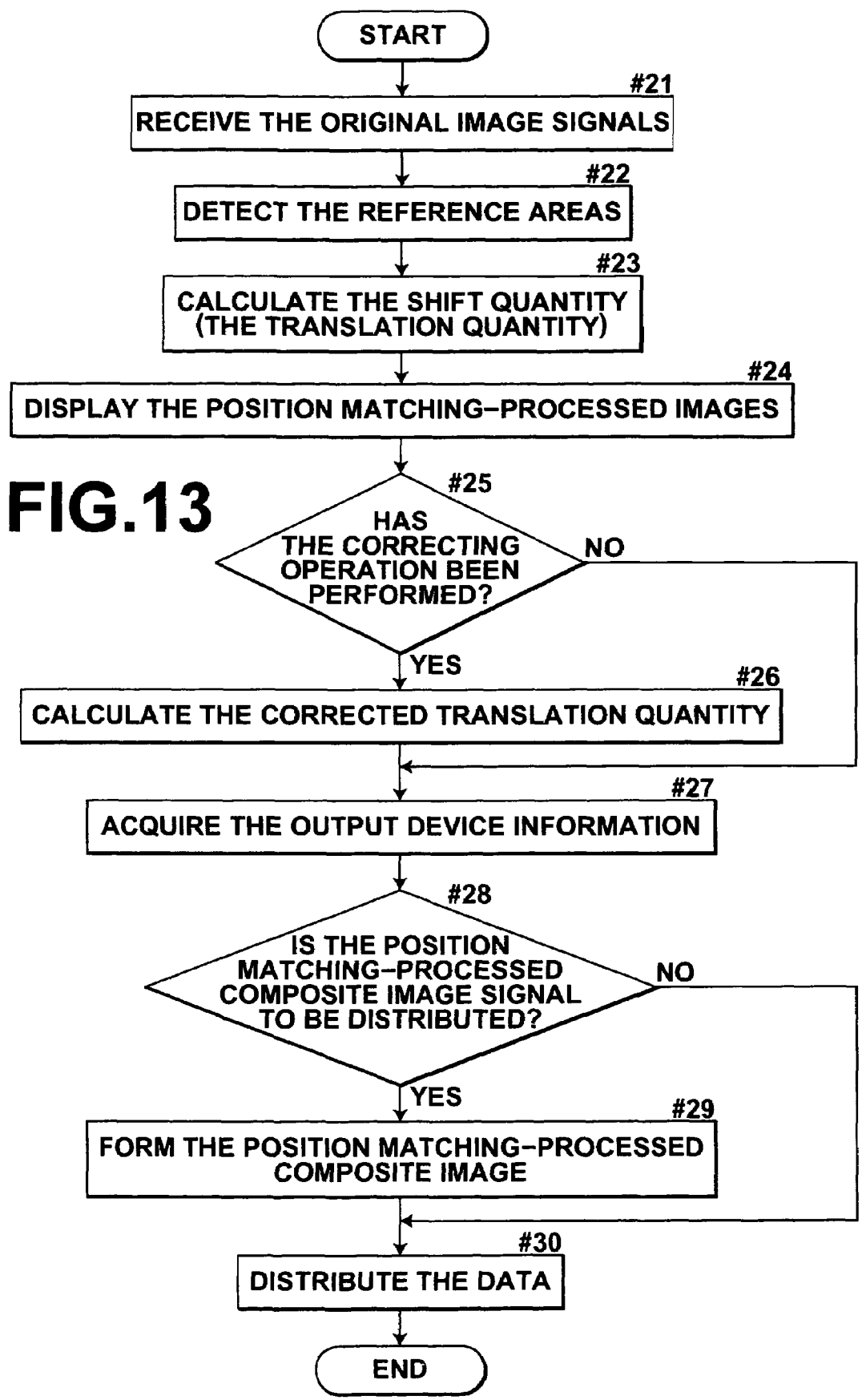
FIG. 13 is a flow chart showing how the different embodiment of the image position matching apparatus in accordance with the present invention performs processing.

In the image position matching apparatus 3B of the image understanding aiding system Y, the distribution means 33B acquires the output device information R, which concerns the image output device that is the destination of the distribution, at the time of the distribution. Alternatively, as in an image position matching apparatus 3C, which is a different embodiment of the image position matching apparatus in accordance with the present invention, position matching processing means 32C may acquire the output device information R in accordance with the patient and examination information Q. The image position matching apparatus 3C operates in the manner described below. Specifically, as illustrated in FIG. 13, receiving means 31C of the image position matching apparatus 3C performs the process in a step #21 in the same manner as that for the step #11 illustrated in FIG. 10. Also, the position matching processing means 32C of the image position matching apparatus 3C performs the processes in a step #22 to a step #26 in the same manner as that for the step #12 to the step #16 illustrated in FIG. 10. Thereafter, in a step #27, in the same manner as that for the step #18 illustrated in FIG. 10, the position matching processing means 32C makes reference to the distribution destination managing table in accordance with the patient and examination information Q and acquires the output device information R. Also, in a step #28, the position matching processing means 32C makes a judgment as to whether the image output device, which is the destination of the distribution, is or is not the image output device into which the image signal representing the position matching-processed composite image P' is to be distributed. In cases where it has been judged that the image output device, which is the destination of the distribution, is the image output device into which the image signal representing the position matching-processed composite image P' is to be distributed, in a step #29, the position matching processing means 32C forms the position matching-processed composite image P'. In such cases, distribution means 33C need not make reference to the distribution destination managing table. In a step #30, it is sufficient for the distribution means 33C to distribute the set of the translation quantity information d, which has been formed by the position matching processing means 32C, and the original image signals P1 and P2, and/or the image signal representing the position matching-processed composite image P' into the image output device, which is the destination of the distribution. In such cases, the image position matching apparatus 3C may form the image signal representing the position matching-processed composite image P' only when necessary. Therefore, the processing efficiency as the entire system is capable of being enhanced even further.

In the aforesaid embodiments, as described above with reference to FIG. 7, either one of the two images, whose positions are to be matched with each other, is translated with the operation of the mouse device, and the manual adjustment of the image position is thereby performed. Alternatively, in lieu of the displayed image being translated, part of the image, which part acts as the reference area for the position matching processing, may be indicated with the input device, such as the mouse device, and the automatic position matching processing may again be performed for aligning the position of the reference area. The result of the first automatic position matching processing may thus be corrected.

In cases where the distribution destination managing table is set in the image storage device 6, it is possible for the image position matching apparatus 3A, the image position matching apparatus 3B, or the image position matching apparatus 3C to distribute the set of the translation quantity information d and the original image signals P1 and P2, and/or the image signal representing the position matching-processed composite image P' into the image storage device 6. Also, in such cases, compression processing, such as a wavelet transform, may be performed on the image signal, and the compressed image signal having thus been obtained maybe distributed as an image signal file, in which the patient and examination information Q corresponding to the image represented by the compressed image signal has been written at a header area of the image signal file. In cases where the translation quantity information d and the original image signals P1 and P2 has been distributed into the image storage device 6, the image storage device 6 stores the translation quantity information d and the original image signals P1 and P2, such that it is clear which translation quantity information d corresponds to which original image signals P1 and P2.

Also, in the aforesaid embodiments, the CR apparatus 2 is utilized in the image forming system. However, in the image understanding aiding system in accordance with the present invention, no limitation is imposed upon the kind of the image forming system, i.e. the kind of the modality for forming the images. For example, the image understanding aiding system in accordance with the present invention is also applicable when an image forming system utilizing a solid-state radiation detector is employed.

What is claimed is:

1. An image understanding aiding system, comprising an image position matching apparatus and an image output device,
    the image position matching apparatus operating such that:
        the image position matching apparatus receives a plurality of original images of objects, which original images are successively sent from a modality for forming the original images,
        the image position matching apparatus performs position matching processing on two original images among the received original images, which two original images are the original images of a pair of objects to be compared with each other and have been recorded at an identical period, in cases where the two original images are to be outputted such that the two original images are located in a line, the position matching processing comprising translation of at least either one of the two original images in a direction normal to the direction along which the two original images are located in a line, such that positions of reference areas in the two original images, which positions are taken with respect to the normal direction, align with each other, and
        the image position matching apparatus supplies information, which represents a translation quantity for aligning the positions of the reference areas in the two original images with each other, and the two original images into the image output device,
    the image output device operating such that:
        the image output device aligns the positions of the reference areas in the two original images with each other in accordance with the information, which represents the translation quantity, and the two original images, the information and the two original images having been received from the image position matching apparatus, and
        the image output device outputs the two aligned images, whose reference areas have been aligned with each other, such that the two aligned images are located in a line.

2. An image understanding aiding system as defined in claim 1 wherein the image position matching apparatus selectively supplies a set of the information, which represents the translation quantity, and the two original images, and/or a set of position matching-processed images, which have been obtained from the position matching processing, into the image output device in accordance with a request of the image output device,
    the image output device aligns the positions of the reference areas in the two original images with each other in accordance with the set of the information, which represents the translation quantity, and the two original images, or in accordance with the set of the position matching-processed images, the set of the information and the two original images or the set of the position matching-processed images having been received from the image position matching apparatus, and
    the image output device outputs the two aligned images, whose reference areas have been aligned with each other, such that the two aligned images are located in a line.

3. An image understanding aiding system as defined in claim 1 wherein the position matching processing performed by the image position matching apparatus comprises automatic position matching processing, in which the reference area in at least either one of the two original images is detected, and in which the processing for aligning the position of the detected reference area is performed automatically.

4. An image understanding aiding system as defined in claim 2 wherein the position matching processing performed by the image position matching apparatus comprises automatic position matching processing, in which the reference area in at least either one of the two original images is detected, and in which the processing for aligning the position of the detected reference area is performed automatically.

5. An image understanding aiding system as defined in claim 3 wherein the position matching processing performed by the image position matching apparatus further comprises correction processing for manually correcting the result of the automatic position matching processing.

6. An image understanding aiding system as defined in claim 4 wherein the position matching processing performed by the image position matching apparatus further comprises correction processing for manually correcting the result of the automatic position matching processing.

7. An image understanding aiding system as defined in claim 1 wherein the image position matching apparatus constitutes part of a quality assurance workstation for receiving the plurality of the original images of the objects, which original images are successively sent from the modality for forming the original images, and performing normalization processing, image quality checking, or the like, on the received original images.

8. An image understanding aiding system as defined in claim 1 wherein the pair of the objects to be compared with each other are right and left breasts of a female, and each of the reference areas in the two original images is a pattern of a nipple, which is an end point of breastry glands.

9. An image position matching apparatus, comprising:
    i) receiving means for receiving a plurality of original images of objects, which original images are successively sent from a modality for forming the original images,
    ii) position matching processing means for performing position matching processing on two original images among the received original images, which two original images are the original images of a pair of objects to be compared with each other and have been recorded at an identical period, in cases where the two original images are to be outputted such that the two original images are located in a line, the position matching processing comprising translation of at least either one of the two original images in a direction normal to the direction along which the two original images are located in a line, such that positions of reference areas in the two original images, which positions are taken with respect to the normal direction, align with each other, the position matching processing means forming information, which represents a translation quantity for aligning the positions of the reference areas in the two original images with each other, with the position matching processing, and iii) supplying means for supplying the information, which represents the translation quantity for aligning the positions of the reference areas in the two original images with each other, and the two original images into a predetermined external device.

10. An image position matching apparatus as defined in claim 9 wherein the position matching processing means forms the information, which represents the translation quantity, and position matching-processed images, which have been obtained from the position matching processing, and the supplying means selectively supplies a set of the information, which represents the translation quantity, and the two original images, and/or a set of the position matching-processed images into the external device in accordance with a request of the external device.

11. An image position matching apparatus as defined in claim 9 wherein the position matching processing means selectively forms the information, which represents the translation quantity, and/or position matching-processed images, which have been obtained from the position matching processing, in accordance with a request of the external device, and the supplying means supplies a set of the information, which represents the translation quantity, and the two original images, and/or a set of the position matching-processed images into the external device.

12. An image position matching apparatus as defined in claim 9 wherein the position matching processing means comprises an automatic position matching processing section, in which the reference area in at least either one of the two original images is detected, and in which the processing for aligning the position of the detected reference area is performed automatically.

13. An image position matching apparatus as defined in claim 10 wherein the position matching processing means comprises an automatic position matching processing section, in which the reference area in at least either one of the two original images is detected, and in which the processing for aligning the position of the detected reference area is performed automatically.

14. An image position matching apparatus as defined in claim 11 wherein the position matching processing means comprises an automatic position matching processing section, in which the reference area in at least either one of the two original images is detected, and in which the processing for aligning the position of the detected reference area is performed automatically.

15. An image position matching apparatus as defined in claim 12 wherein the position matching processing means further comprises a correction processing section for manually correcting the result of the automatic position matching processing performed by the automatic position matching processing section.

16. An image position matching apparatus as defined in claim 13 wherein the position matching processing means further comprises a correction processing section for manually correcting the result of the automatic position matching processing performed by the automatic position matching processing section.

17. An image position matching apparatus as defined in claim 14 wherein the position matching processing means further comprises a correction processing section for manually correcting the result of the automatic position matching processing performed by the automatic position matching processing section.

18. An image output device, comprising:
i) position adjusting means, which is associated with an image position matching apparatus,
the image position matching apparatus operating such that:
the image position matching apparatus receives a plurality of original images of objects, which original images are successively sent from a modality for forming the original images, and
the image position matching apparatus performs position matching processing on two original images among the received original images, which two original images are the original images of a pair of objects to be compared with each other and have been recorded at an identical period, in cases where the two original images are to be outputted such that the two original images are located in a line, the position matching processing comprising translation of at least either one of the two original images in a direction normal to the direction along which the two original images are located in a line, such that positions of reference areas in the two original images, which positions are taken with respect to the normal direction, align with each other,
the position adjusting means receiving information, which represents a translation quantity for aligning the positions of the reference areas in the two original images with each other, and the two original images from the image position matching apparatus,
the position adjusting means adjusting an output position of at least either one of the two original images in accordance with the information, which represents the translation quantity, and the two original images, the information and the two original images having been received from the image position matching apparatus, such that the positions of the reference areas in the two original images align with each other, and
ii) output means for outputting the two aligned images, which have been obtained from the adjustment of the output position, such that the two aligned images are located in a line.

19. An image understanding aiding system as defined in claim 1, wherein the reference areas in the two original images feature areas of the object patterns in the format of one of outer shape feature areas, image density feature areas, or luminance feature areas.

20. An image understanding aiding system as defined in claim 1, wherein images recorded at said identical period are recorded at one time of examination.

* * * * *